(12) United States Patent
Eguchi et al.

(10) Patent No.: US 10,003,714 B2
(45) Date of Patent: Jun. 19, 2018

(54) IMAGE FORMING APPARATUS, CONTROL METHOD, AND NON-TRANSITORY RECORDING MEDIUM WHICH ADJUSTS TIMING OF PRINT ENABLE SIGNAL ACCORDING TO ATMOSPHERIC PRESSURE

(71) Applicant: KONICA MINOLTA, INC., Chiyoda-ku, Tokyo (JP)

(72) Inventors: Tatsuya Eguchi, Toyohashi (JP); Isao Watanabe, Toyohashi (JP); Takeshi Ishida, Toyohashi (JP); Hiroaki Takatsu, Nishio (JP); Taku Kimura, Toyokawa (JP); Atomu Nakashima, Toyokawa (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days. days.

(21) Appl. No.: 15/690,089

(22) Filed: Aug. 29, 2017

(65) Prior Publication Data

US 2018/0059571 A1   Mar. 1, 2018

(30) Foreign Application Priority Data

Aug. 30, 2016  (JP) ................................. 2016-168066

(51) Int. Cl.
*G03G 15/01* (2006.01)
*H04N 1/00* (2006.01)
(Continued)

(52) U.S. Cl.
CPC ....... *H04N 1/113* (2013.01); *G03G 15/04072* (2013.01); *G06K 15/1204* (2013.01); *G03G 2215/0404* (2013.01)

(58) Field of Classification Search
CPC ........... G03G 15/043; G03G 15/04072; G03G 2215/0404; H04N 1/113; H04N 1/1135; G06K 15/1204; G06K 15/1228
(Continued)

(56) References Cited

U.S. PATENT DOCUMENTS

| 7,570,386 B2 * | 8/2009 | Heink .................... H04N 1/047 347/116 |
| 8,203,588 B2 * | 6/2012 | Klemer .................... B41J 2/471 347/241 |
| 2017/0329252 A1 * | 11/2017 | Emanueli ............. G03G 15/043 |

FOREIGN PATENT DOCUMENTS

| JP | 09061742 A | 3/1997 |
| JP | 09066629 A | 3/1997 |

(Continued)

*Primary Examiner* — Robert Beatty
(74) *Attorney, Agent, or Firm* — Holtz, Holtz & Volek PC

(57) ABSTRACT

An image forming apparatus includes an acquiring unit configured to acquire atmosphere pressure in the installation place of the image forming apparatus, photoconductors, light sources configured to radiate laser light, and a polygon mirror configured to be rotatable. The polygon mirror exposes the photoconductors by reflecting the laser light toward the photoconductors while rotating. The image forming apparatus further includes a control device configured to control rotation of the polygon mirror. The control device outputs an enable signal for allowing the image forming apparatus to perform printing, if rotation of the polygon mirror is stabilized after start of the rotation, and advances the timing of outputting the enable signal as the atmosphere pressure increases.

13 Claims, 12 Drawing Sheets

(51) Int. Cl.
*G06K 15/00* (2006.01)
*H04N 1/113* (2006.01)
*G06K 15/12* (2006.01)
*G03G 15/04* (2006.01)

(58) Field of Classification Search
USPC ....... 399/4, 51, 179; 347/235, 243, 250, 261
See application file for complete search history.

(56) References Cited

FOREIGN PATENT DOCUMENTS

| | | | |
|---|---|---|---|
| JP | 2000235161 A | | 8/2000 |
| JP | 2003241132 A | * | 8/2003 |

* cited by examiner

| ATMOSPHERE PRESSURE | SIGNAL WAITING TIME |
|---|---|
| HIGH | T1 (SHORT) |
| INTERMEDIATE | T2 (INTERMEDIATE) |
| LOW | T3 (LONG) |

|  |  | TEMPERATURE | | |
|---|---|---|---|---|
|  |  | HIGH | INTERMEDIATE | LOW |
| ATMOSPHERE PRESSURE | HIGH | T3 | T2 | T1 |
|  | INTERMEDIATE | T4 | T3 | T2 |
|  | LOW | T5 | T4 | T3 |

SHORT ←T1 — T5→ LONG

124A

IMAGE FORMING APPARATUS, CONTROL METHOD, AND NON-TRANSITORY RECORDING MEDIUM WHICH ADJUSTS TIMING OF PRINT ENABLE SIGNAL ACCORDING TO ATMOSPHERIC PRESSURE

CROSS-REFERENCE TO RELATED APPLICATIONS

The entire disclosure of Japanese Patent Application No. 2016-168066 filed on Aug. 30, 2016 including description, claims, drawings, and abstract are incorporated herein by reference in its entirety.

BACKGROUND OF THE INVENTION

Field of the Invention

The present disclosure relates to control of an image forming apparatus, and more particularly, to control of a polygon mirror provided in an image forming apparatus.

Description of the Related Art

Image forming apparatuses such as MFP (Multi-Functional Peripheral) are widely known. An electrophotographic image forming apparatus includes, as printing steps, a step of charging a photoconductor, a step of exposing the photoconductor according to the input image pattern, and a step of attaching toner to the electrostatic latent image formed by the exposure step.

The step of exposing the photoconductor will be described below. In the image forming apparatus, a light source emitting laser light is provided. The laser light emitted from the light source is irradiated onto the polygon mirror. The polygon mirror has a prismatic shape (for example, a hexagonal prism), and the side surfaces of the polygon mirror are configured with mirrors. The polygon mirror is configured to be rotatable and regularly changes the reflection direction of the laser light by reflecting the laser light while rotating at high speed. The laser light reflected by the polygon mirror is guided to the photoconductor. The image forming apparatus exposes a determined position on the photoconductor by turning on and off the laser light according to the input image pattern while rotating the polygon mirror. As a result, an electrostatic latent image representing the input image pattern is formed on the photoconductor.

In recent years, in order to improve a printing accuracy, a technique for stabilizing the rotation of the polygon mirror has been developed. Regarding this technology, JP 09-066629 A discloses an image forming apparatus for improving the stability and durability of rotation of a motor used for driving a polygon mirror. JP 2000-235161 A discloses a rotation driving device for stabilizing a bearing portion by pressurizing the bearing portion of a motor for driving a polygon mirror. JP 09-061742 A discloses an impact-pressure bearing type optical deflector capable of reducing a power loss of a motor driving a polygon mirror.

When the polygon mirror rotates, ambient air becomes a load (i.e. air resistance). When the ambient atmospheric pressure changes, the magnitude of the load applied to the polygon mirror also fluctuates. In other words, the magnitude of the load which the polygon mirror receives during rotation varies depending on whether the image forming apparatus is placed at a high ground or at a low ground.

In general, the image forming apparatus starts rotating the polygon mirror based on the print instruction signal, and outputs a signal for allowing to print after the rotation of the polygon mirror is stabilized (Hereinafter also referred to as "print enable signal"). As described above, the magnitude of the load applied to the polygon mirror fluctuates according to the ambient atmospheric pressure, so the timing at which the rotation of the polygon mirror is stabilized varies according to the ambient atmospheric pressure. Therefore, an appropriate timing for outputting the print enable signal varies depending on the ambient atmospheric pressure. However, the above mentioned patent documents do not disclose how appropriately the timing of outputting the print enable signal is controlled according to the ambient atmospheric pressure. Therefore, there is a demand for an image forming apparatus capable of outputting a print enable signal at an appropriate timing according to ambient atmospheric pressure.

SUMMARY OF THE INVENTION

The present disclosure has been made to solve the above-described problems, and an object of a certain aspect is to provide an image forming apparatus capable of outputting a print enable signal at an appropriate timing according to ambient atmospheric pressure. An object of another aspect is to provide a control method of an image forming apparatus capable of outputting a print enable signal at an appropriate timing according to ambient atmospheric pressure. Still another object of the other aspect is to provide a non-transitory recording medium storing a computer readable program which is a control program of an image forming apparatus capable of outputting a print enable signal at an appropriate timing according to ambient atmospheric pressure.

To achieve at least one of the abovementioned objects, according to an aspect, an image forming apparatus reflecting one aspect of the present invention comprises an acquiring unit configured to acquire atmosphere pressure in the installation place of the image forming apparatus, photoconductors, light sources configured to radiate laser light, and a polygon mirror configured to be rotatable. The polygon mirror exposes the photoconductors by reflecting the laser light toward the photoconductors while rotating. The image forming apparatus further includes a control device configured to control rotation of the polygon mirror. The control device outputs an enable signal for allowing the image forming apparatus to perform printing, if rotation of the polygon mirror is stabilized after start of the rotation, and adjusts the timing of outputting the enable signal on the basis of the atmosphere pressure acquired by the acquiring unit.

Preferably, the image forming apparatus further comprises a storage unit configured to store atmosphere pressure information defining a time required to stabilize rotation of the polygon mirror after start of rotation for each atmosphere pressure. The control device specifies an atmosphere pressure closest to the atmosphere pressure acquired by the acquiring unit, from atmosphere pressures defined in the atmosphere pressure information, and determines the timing of outputting the enable signal, on the basis of a time associated with the specified atmosphere pressure.

Preferably, the acquiring unit includes an atmosphere pressure sensor configured to detect atmosphere pressure.

Preferably, the acquiring unit includes an operation panel configured to receive an atmosphere pressure input.

Preferably, the acquiring unit includes a location detecting unit configured to detect the installation place of the image forming apparatus, and an atmosphere pressure specifying unit configured to specify atmosphere pressure in the installation place of the image forming apparatus, on the basis of information defining atmosphere pressures in individual regions.

Preferably, the image forming apparatus further comprises a temperature sensor configured to detect the internal temperature of the image forming apparatus. The control device advances the timing of outputting the enable signal as the atmosphere pressure increases and as the temperature decreases.

Preferably, oil is put between a motor configured to drive the polygon mirror and a bearing of the motor.

Preferably, the control device controls a motor configured to drive the polygon mirror by PLL (Phase Locked Loop) control.

Preferably, the control device outputs the enable signal if a predetermined time elapses after the rotation speed of the polygon mirror falls into a determined range, and reduces the predetermined time as the atmosphere pressure increases.

Preferably, the acquiring unit performs the atmosphere pressure acquiring process in response to reception of a setup command for the image forming apparatus.

Preferably, the acquiring unit performs the atmosphere pressure acquiring process in response to reception of an activation command for the image forming apparatus.

To achieve at least one of the abovementioned objects, according to another aspect, a control method of an image forming apparatus having a polygon mirror reflecting one aspect of the present invention comprises: a step of acquiring atmosphere pressure in the installation place of the image forming apparatus; a step of radiating laser light onto the polygon mirror while rotating the polygon mirror, thereby exposing photoconductors to the laser light reflected from the polygon mirror; and a step of outputting an enable signal for allowing the image forming apparatus to perform printing, if rotation of the polygon mirror is stabilized after start of the rotation. The outputting step includes a step of adjusting a timing of outputting the enable signal on the basis of the atmosphere pressure acquired by the acquiring step.

To achieve at least one of the abovementioned objects, according to a further aspect, a control method of an image forming apparatus having a polygon mirror reflecting one aspect of the present invention makes the image forming apparatus perform a step of acquiring atmosphere pressure in the installation place of the image forming apparatus, a step of radiating laser light onto the polygon mirror while rotating the polygon mirror, thereby exposing photoconductors to the laser light reflected from the polygon mirror, and a step of outputting an enable signal for allowing the image forming apparatus to perform printing, if rotation of the polygon mirror is stabilized after start of the rotation. The outputting step includes a step of adjusting a timing of outputting the enable signal on the basis of the atmosphere pressure acquired by the acquiring step.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 14 is a view illustrating the data structure of atmosphere pressure information according to a second embodiment.

DESCRIPTION OF THE PREFERRED EMBODIMENTS

Hereinafter, an embodiment of the present invention will be described with reference to the drawings. However, the scope of the invention is not limited to the illustrated examples.

Hereinafter, individual embodiments according to the present invention will be described with reference to the drawings. In the following description, identical components and identical constituent elements are denoted by the same reference symbols. Their names and functions are also the same. Therefore, detailed descriptions of them will not be repeated. Also, individual embodiments and individual modifications to be described below may be appropriately and selectively combined.

First Embodiment

[Image Forming Apparatus 100]

Figure 1:
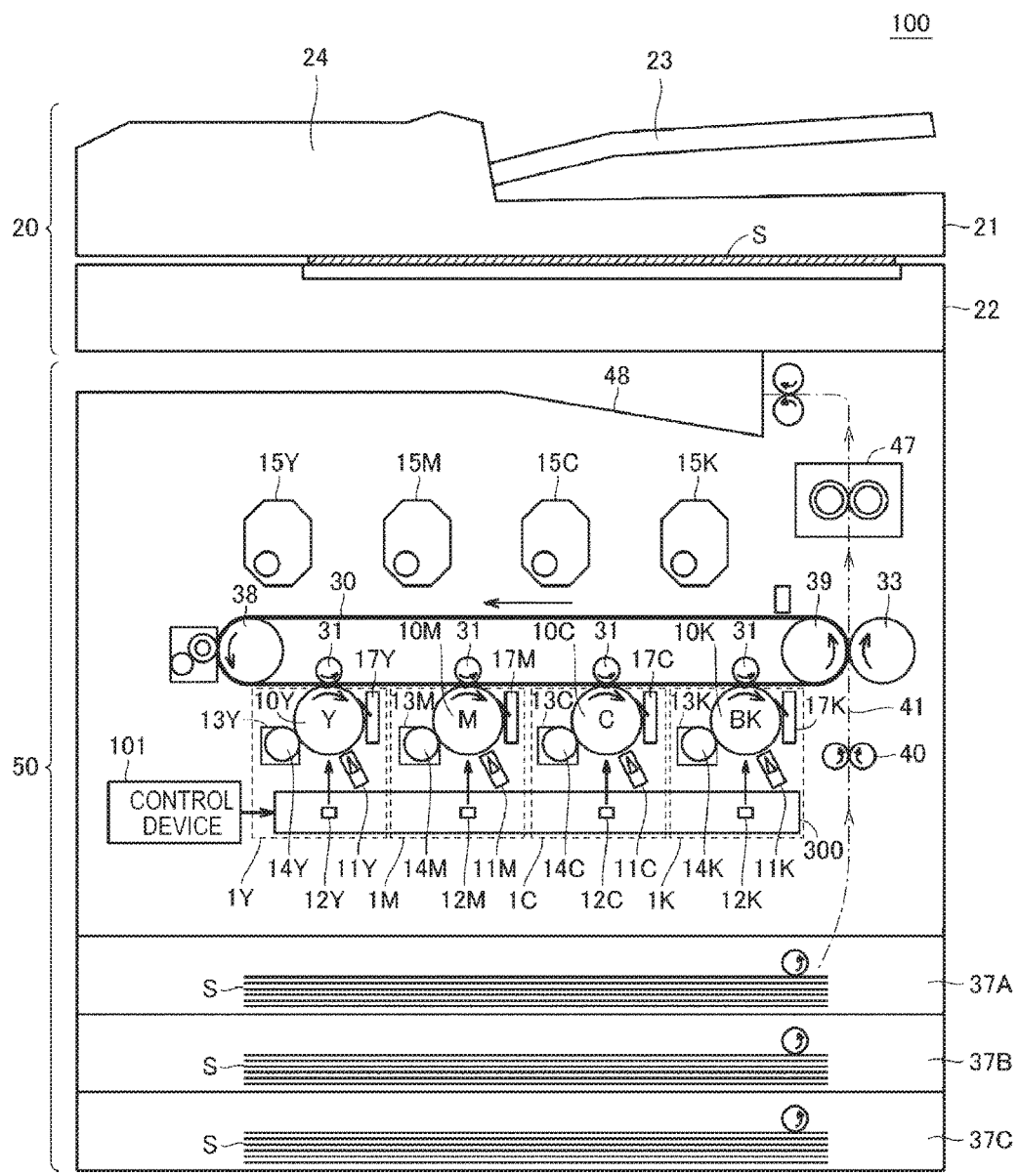
FIG. 1 is a view illustrating an example of the apparatus configuration of an image forming apparatus according to a first embodiment.

With reference to FIG. 1, an image forming apparatus 100 according to the first embodiment will be described. FIG. 1 is a view illustrating an example of the apparatus configuration of the image forming apparatus 100.

FIG. 1 shows the image forming apparatus 100 as a color printer. Hereinafter, the image forming apparatus 100 which is a color printer will be described; however, the image forming apparatus 100 is not limited to a color printer. For example, the image forming apparatus 100 may be a monochrome printer, or may be a multi-functional printer (a so-called MFP) of a monochrome printer, a color printer, and a FAX.

The image forming apparatus 100 is composed of a scanner 20 and a printer 50. The scanner 20 is composed of a cover 21, a sheet table 22, a tray 23, and an auto document feeder (ADF) 24. One end of the cover 21 is fixed to the sheet table 22, and the cover 21 is configured to be capable of being opened and closed with the corresponding end being a fulcrum. A user of the image forming apparatus 100 can open the cover 21 such that it is possible to set a sheet S on the sheet table 22. If the image forming apparatus 100 receives a scan instruction in a state where a sheet S is set on the sheet table 22, it starts scanning the sheet S set on the sheet table 22. Also, if the image forming apparatus 100 receives a scan instruction in a state where sheets S are set on the tray 23, the sheets S are automatically read one by one by the ADF 24.

The printer 50 includes image forming units 1Y, 1M, 1C, and 1K, an intermediate transfer belt 30, primary transfer rollers 31, a secondary transfer roller 33, cassettes 37A to 37C, a driven roller 38, a drive roller 39, timing rollers 40, a fixing device 47, and a control device 101.

The image forming units 1Y, 1M, 1C, and 1K are arranged in order along the intermediate transfer belt 30. The image forming unit 1Y receives supply of toner from a toner bottle 15Y, thereby forming a yellow (Y) toner image. The image forming unit 1M receives supply of toner from a toner bottle 15M, thereby forming a magenta (M) toner image. The image forming unit 1C receives supply of toner from a toner bottle 15C, thereby forming a cyan (C) toner image. The image forming unit 1K receives supply of toner from a toner bottle 15K, thereby forming a black (BK) toner image.

The image forming unit 1Y includes a photoconductor 10Y, a charging device 11Y, a light source 12Y, a developing device 13Y, and a cleaning device 17Y. The image forming unit 1M includes a photoconductor 10M, a charging device 11M, a light source 12M, a developing device 13M, and a cleaning device 17M. The image forming unit 1C includes a photoconductor 10C, a charging device 11C, a light source 12C, a developing device 13C, and a cleaning device 17C. The image forming unit 1K includes a photoconductor 10K, a charging device 11K, a light source 12K, a developing device 13K, and a cleaning device 17K.

Hereinafter, the photoconductors 10Y, 10M, 10C, and 10K will also be collectively referred to as the photoconductors 10. The charging devices 11Y, 11M, 11C, and 11K will also be collectively referred to as the charging devices 11. The light sources 12Y, 12M, 12C, and 12K will also be collectively referred to as the light sources 12. The developing devices 13Y, 13M, 13C, and 13K will also be collectively referred to as the developing devices 13. The cleaning devices 17Y, 17M, 17C, and 17K will also be collectively referred to as the cleaning devices 17.

The charging devices 11 uniformly charge the surfaces of the photoconductors 10. The light sources 12 radiate laser light onto the photoconductors 10 in accordance with a control signal from the control device 101, thereby exposing the surfaces of the photoconductors 10 in accordance with the pattern of an input image. As a result, electrostatic latent images according to the input image are formed on the photoconductors 10. The light sources 12 are provided on a print head 300. The details of the print head 300 will be described below.

The developing devices 13 apply a developing bias to developing rollers 14 while rotating the developing rollers 14, thereby attaching the toner to the surfaces of the developing rollers 14. As a result, the toner is transferred from the developing rollers 14 onto the photoconductors 10, whereby the toner images according to the electrostatic latent images are developed on the surfaces of the photoconductors 10.

The photoconductors 10 and the intermediate transfer belt 30 are in contact with each other at parts where the primary transfer rollers 31 are provided. A transfer voltage having the opposite polarity to that of the toner images is applied to the primary transfer rollers 31, whereby the toner images are transferred from the photoconductors 10 onto the intermediate transfer belt 30. The yellow (Y) toner image, the magenta (M) toner image, the cyan (C) toner image, and the black (BK) toner image are sequentially transferred from the photoconductors 10 onto the intermediate transfer belt 30, so as to be superimposed. As a result, a color toner image is formed on the intermediate transfer belt 30.

The intermediate transfer belt 30 is suspended between the driven roller 38 and the drive roller 39. The drive roller 39 is rotated by a motor (not shown in the drawings). The intermediate transfer belt 30 and the driven roller 38 rotate in conjunction with rotation of the drive roller 39. As a result, the toner image formed on the intermediate transfer belt 30 is transported toward the secondary transfer roller 33.

The cleaning devices 17 are pressed so as to come into contact with the photoconductors 10. The cleaning devices 17 recover the toner remaining on the surfaces of the photoconductors 10 after transferring of the toner images.

In the cassettes 37A to 37C, sheets S having different sizes are set, respectively. Hereinafter, the cassettes 37A to 37C will also be collectively referred to as the cassettes 37. The sheets S are sent from the cassette 37C toward the secondary transfer roller 33 along a transport path 41 one by one by the timing rollers 40. When a sheet S is transported, the secondary transfer roller 33 applies the transfer voltage having the opposite polarity to that of the toner image, to the corresponding sheet. As a result, the toner image is attracted from the intermediate transfer belt 30 toward the secondary transfer roller 33, whereby the toner image on the intermediate transfer belt 30 is transferred. The timing of transporting the sheet S toward the secondary transfer roller 33 is adjusted in accordance with the position of the toner image on the intermediate transfer belt 30 by the timing rollers 40. The toner image on the intermediate transfer belt 30 is transferred onto an appropriate position of the sheet S by the timing rollers 40.

When the sheet S passes through the fixing device 47, the fixing device heats the sheet while pressing the sheet. As a result, the toner image is fixed to the sheet S. Thereafter, the sheet S is discharged onto a tray 48.

[Print Head 300]

Figure 2:
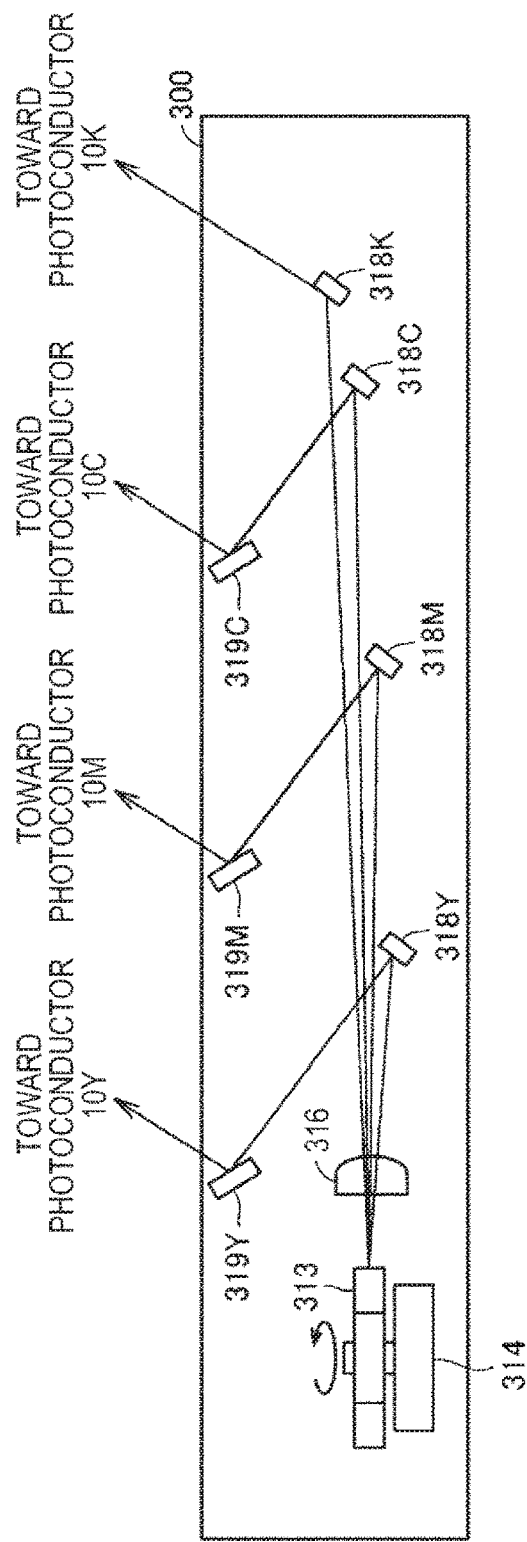
FIG. 2 is a front view illustrating the internal structure of a print head according to the first embodiment.
Figure 3:
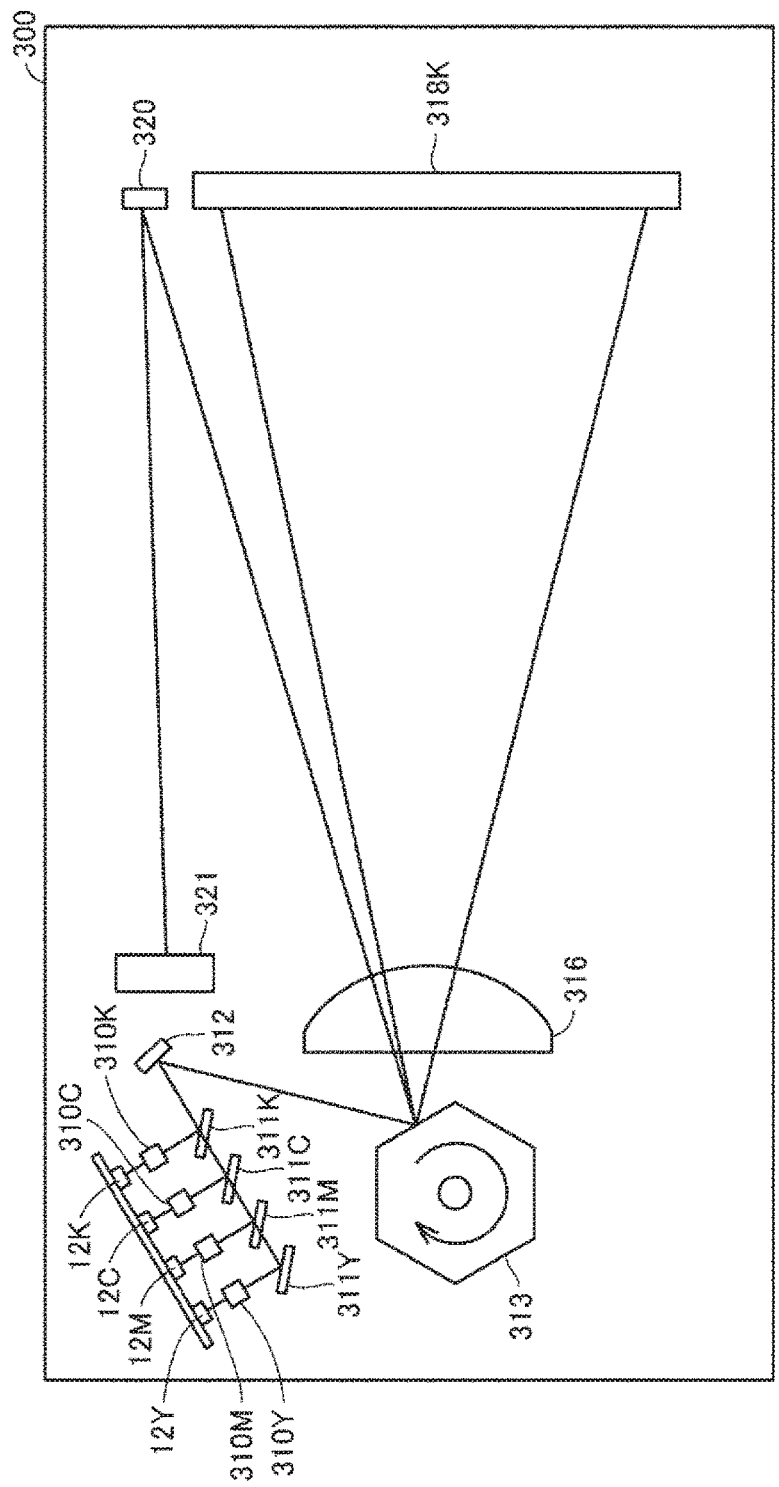
FIG. 3 is a plan view illustrating the internal structure of the print head according to the first embodiment.

With reference to FIGS. 2 and 3, the internal structure of the print head 300 shown in FIG. 1 will be described. FIG. 2 is a front view illustrating the internal structure of the print head 300. FIG. 3 is a plan view illustrating the internal structure of the print head 300.

As shown in FIGS. 2 and 3, the print head 300 includes the light sources 12Y, 12M, 12C, and 12K, collimator lenses 310Y, 310M, 310C, and 310K, mirrors 311Y, 311M, 311C, and 311K, a mirror 312, a polygon mirror 313, a motor 314, an f-θ lens 316, mirrors 318Y, 318M, 318C, and 318K, mirrors 319Y, 319M, and 319C, a mirror 320, and a light sensor 321.

In order to facilitate understanding, in FIG. 3, the mirrors 318Y, 318M, and 318C and the mirrors 319Y, 319M, and 319C shown in FIG. 2 are not shown. Hereinafter, with a focus on laser light which is radiated from the light source 12K, the path of laser light will be described.

The laser light radiated from the light source 12K is collected by the collimator lens 310K, and is radiated onto the mirror 311K. The mirror 311K reflects the laser light having passed through the collimator lens 310K toward the mirror 312. The mirror 312 reflects the corresponding laser light toward the polygon mirror 313.

The polygon mirror 313 has a prismatic shape (for example, a hexagonal prism). The side surfaces of the polygon mirror 313 are configured with mirrors. The polygon mirror 313 is rotated by the motor 314. The polygon mirror 313 reflects the laser light while rotating, thereby regularly changing the reflection direction of the laser light. While rotating, the polygon mirror 313 reflects the laser light toward the f-θ lens 316. The laser light having passed through the f-θ lens 316 is reflected toward the photoconductor 10K (see FIG. 1) by a mirror 318.

The image forming apparatus 100 rotates the photoconductor 10K while rotating the polygon mirror 313, thereby scanning the photoconductor 10K with the laser light reflected by the polygon mirror 313. At this time, one line of the photoconductor 10K in a main scan direction is scanned by a mirror corresponding to one surface of the polygon mirror 313. The main scan direction represents the direction of the rotation axis of the photoconductor 10. In a case where the polygon mirror 313 is configured with a mirror having six surfaces, whenever the polygon mirror 313 makes one revolution, six lines of the photoconductor 10K in the main scan direction are scanned. The image forming apparatus 100 turns on and off the light source 12K in accordance with the input image pattern, thereby exposing determined positions on the photoconductor 10K. As a result, an electrostatic latent image representing the input image is formed on the photoconductor 10K.

Similarly, laser light radiated from the light source 12Y is reflected onto the photoconductor 10Y by the polygon mirror 313. Laser light radiated from the light source 12M is reflected onto the photoconductor 10M by the polygon mirror 313. Laser light radiated from the light source 12C is reflected onto the photoconductor 10C by the polygon mirror 313. Since the mirrors 311Y, 311M, 311C, and 311K are installed in the manner of steps, the laser light radiated from the light sources 12Y, 12M, 12C, and 12K is reflected onto the photoconductors 10Y, 10M, 10C, and 10K, respectively.

A part of the laser light radiated from the light sources 12 is guided to the light sensor 321 by the mirror 312. If the light sensor 321 receives the reflected light from the mirror 320, it outputs a synchronization signal (i.e. an SOS (Start Of Scan) signal) to be a reference signal for controlling the timing of performing exposure in the main scan direction. The print head 300 uses the synchronization signal to synthesize light emission of the light sources 12 in the main scan direction.

[Print Enable Signal]

The image forming apparatus 100 starts rotating the polygon mirror 313, in response to reception of a print instruction, and outputs a signal (a print enable signal) for allowing printing after rotation of the polygon mirror 313 is stabilized.

The magnitude of a load which is applied to the polygon mirror 313 when the polygon mirror rotates fluctuates according to ambient atmospheric pressure. Therefore, the timing at which the rotation of the polygon mirror 313 is stabilized also varies according to the ambient atmospheric pressure. In other words, an appropriate timing of outputting the print enable signal varies depending on the ambient atmospheric pressure. For this reason, the image forming apparatus 100 according to the present embodiment appropriately adjusts the timing of outputting the print enable signal in accordance with the ambient atmospheric pressure.

Figure 4:
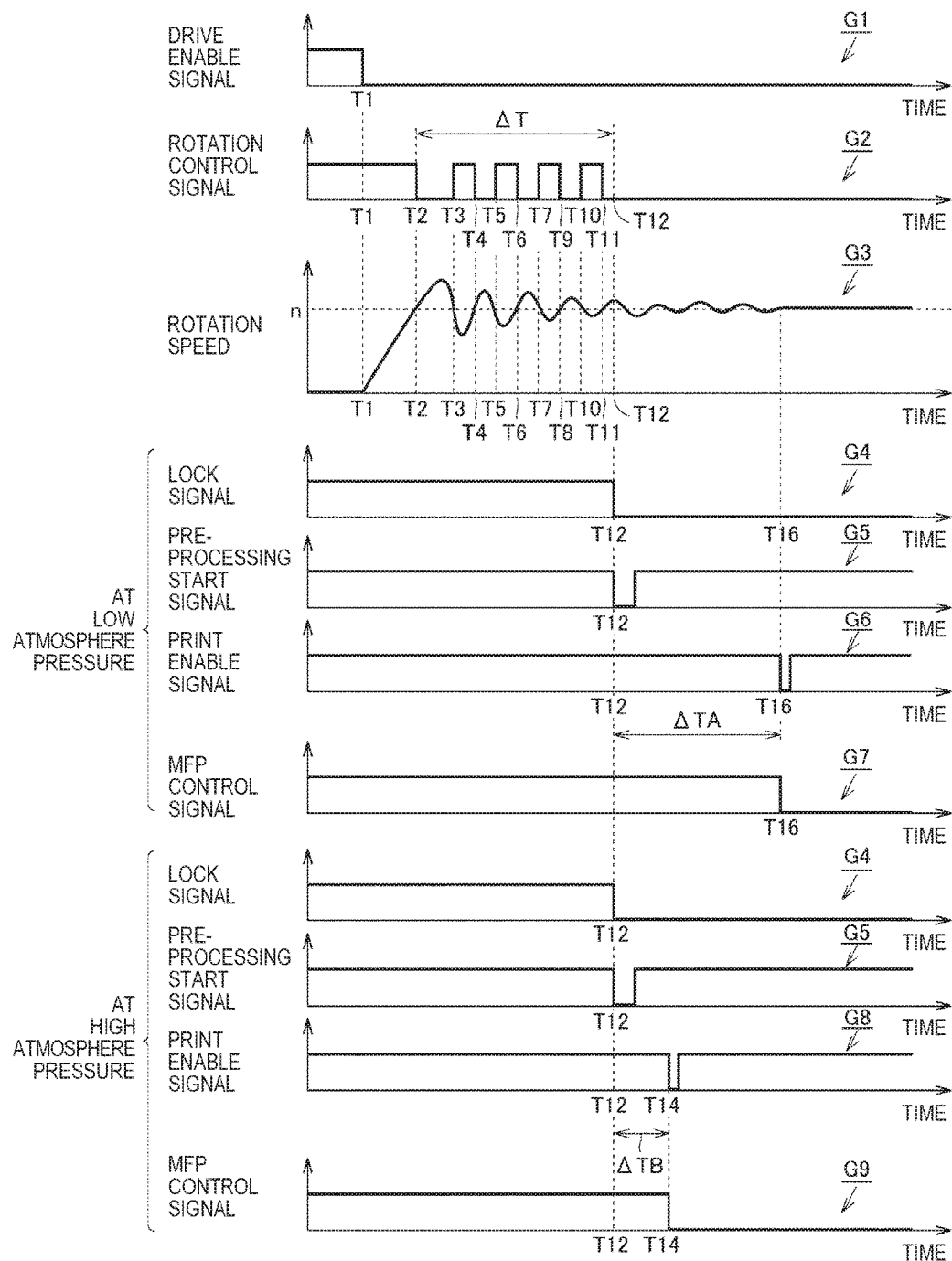
FIG. 4 is a view for explaining a timing of outputting a print enable signal.

Hereinafter, with reference to FIG. 4, the timing of outputting the print enable signal will be described. FIG. 4 is a view for explaining the timing of outputting the print enable signal.

In a graph G1, the waveform of a drive enable signal for allowing driving of the polygon mirror 313 is shown. In the graph G1, as the drive enable signal, a low-active signal is shown. In other words, when the voltage is high, driving of the polygon mirror 313 is prohibited; whereas when the voltage is low, driving of the polygon mirror 313 is allowed.

In a graph G2, the waveform of a control signal which is output to the motor 314 for driving the polygon mirror 313 is shown. In the graph G2, the control signal, a high-active signal is shown. In other words, when the voltage is low, rotating of the motor 314 is stopped; whereas when the voltage is high, the motor 314 is rotated.

In a graph G3, change of the rotation speed of the motor 314 (or the polygon mirror 313) with time is shown. As shown in the graph G3, at a time T1, rotating of the motor 314 is started.

At a time T2, if the rotation speed of the motor 314 reaches a reference rotation speed "n", the image forming apparatus 100 stops rotating the motor 314. Immediately after rotating is stopped, the rotation speed of the motor 314 overshoots the reference rotation speed "n". Thereafter, the rotation speed of the motor 314 gradually decreases.

At a time T3, if the rotation speed of the motor 314 reaches the reference rotation speed "n", the image forming apparatus 100 starts rotating the motor 314. Immediately after rotating starts, the rotation speed of the motor 314 overshoots the reference rotation speed "n". Thereafter, the rotation speed of the motor 314 gradually increases.

From the time T4 to the time T12, the image forming apparatus 100 repeats stop and start of rotating of the motor 314, whereby the rotation speed of the motor 314 gradually approaches the reference rotation speed "n". At this time, the image forming apparatus 100 controls the motor 314 by PLL control. The details of the PLL control will be described below, and under the PLL control, when the rotation speed of the polygon mirror 313 falls into a determined range, a lock signal is output.

In a graph G4, the waveform of the lock signal is shown. In the graph G4, as the lock signal, a low-active signal is shown. In other words, when the voltage is low, the lock signal is output.

In a graph G5, a control signal for performing preprocessing of printing is shown. In the graph G5, as the control signal, a low-active signal is shown. In other words, when the voltage is low, preprocessing of printing is performed. In the example of the graph G5, at the time T12, preprocessing of printing is performed. As preprocessing of printing, processing which does not influence the print quality even if the processing is performed before rotation of the motor 314 is stabilized is performed. As preprocessing of printing, for example, emission of light of the light sources 12 for a predetermined time for APC (Auto Power Control) can be performed.

In a graph G6, the waveform of a print enable signal is shown. In the graph G6, as the print enable signal, a low-active signal is shown. In other words, when the voltage is low, the print enable signal is output. As shown in the graph G6, in order to secure the stability of the level at which it is possible to stably print an image, the image forming apparatus 100 outputs the print enable signal if a time ΔTA (for example, 500 ms) elapses after the lock signal is output.

In a graph G7, a control signal for performing a printing process is shown. In the graph G7, as the control signal, a low-active signal is shown. In other words, when the voltage is low, a printing process is performed. The image forming apparatus 100 starts a printing process in response to reception of a print enable signal. In the example of the graph G7, at a time T16, a printing process is performed.

In a graph G8, the waveform of a print enable signal is shown. As shown in the graph G8, in a case where the atmosphere pressure surrounding the image forming apparatus 100 is high, if a time ΔTB (for example, 100 ms) elapses after the lock signal is output, the print enable signal is output. In contrast with this, in a case where the atmosphere pressure surrounding the image forming apparatus 100 is low, as shown in the graph G6, if the time ΔTA (>the time ΔTB) elapses after the lock signal is output, the print enable signal is output. As described above, the image forming apparatus 100 advances the timing of outputting the print enable signal as the ambient atmospheric pressure increases. The reason is that, as the atmosphere pressure increases, the load to be applied to the polygon mirror 313 increases, whereby the rate of decrease in the rotation speed of the polygon mirror 313 when the motor 314 is stationary increases, and the rotation of the polygon mirror 313 is stabilized early. The timing of outputting the print enable signal is appropriately controlled, whereby the time required to perform a printing process decreases.

In a graph G9, a control signal for performing a printing process is shown. In the graph G9, as the control signal, a low-active signal is shown. In other words, when the voltage is low, a printing process is performed. The image forming apparatus 100 starts a printing process in response to reception of a print enable signal. In the example of the graph G9, at a time T14, a printing process is performed.

[Functional Components of Image Forming Apparatus 100]

Figure 5:
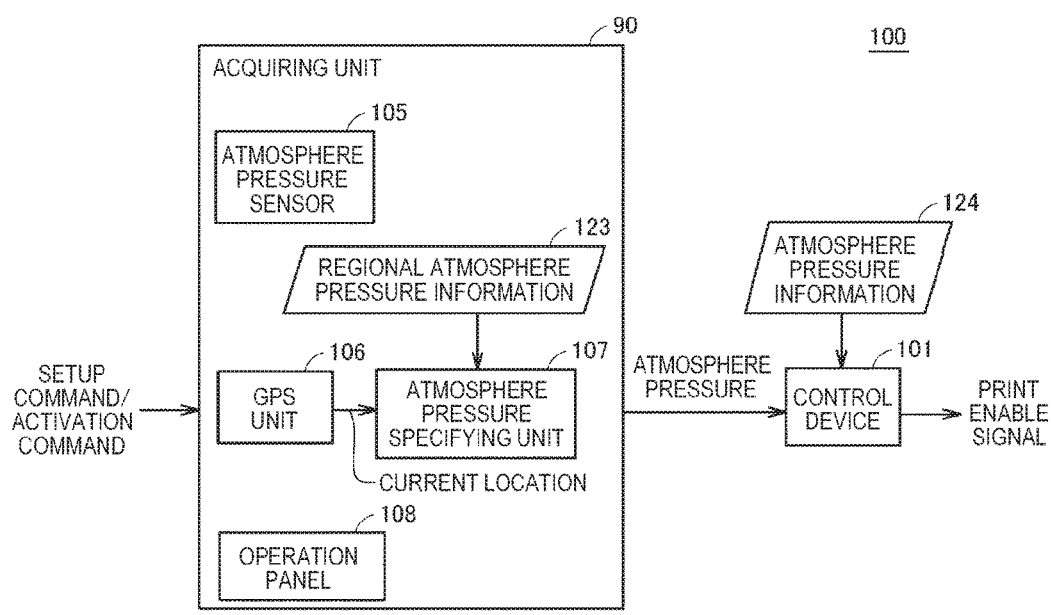
FIG. 5 is a view illustrating examples of functional components for controlling the timing of outputting the print enable signal.

With reference to FIG. 5, functional components of the image forming apparatus 100 for controlling the timing of outputting the print enable signal will be described. FIG. 5 is a view illustrating examples of the functional components for controlling the timing of outputting the print enable signal.

As shown in FIG. 5, the image forming apparatus 100 includes an acquiring unit 90 and the control device 101. Hereinafter, these functional components will be sequentially described.

(Atmosphere Pressure Acquiring Method of Acquiring Unit 90)

The acquiring unit 90 acquires the atmosphere pressure in the installation place of the image forming apparatus 100. As the atmosphere pressure acquiring method of the acquiring unit 90, various methods can be used. Hereinafter, first to third acquiring methods for acquiring the atmosphere pressure will be sequentially described.

First, the first acquiring method of acquiring the atmosphere pressure will be described. The acquiring unit 90 includes an atmosphere pressure sensor 105 for detecting the atmosphere pressure. Preferably, the atmosphere pressure sensor 105 is installed inside the image forming apparatus 100. The atmosphere pressure is acquired directly from the atmosphere pressure sensor 105, so the atmosphere pressure is accurately detected.

Now, the second acquiring method of acquiring atmosphere pressure will be described. The acquiring unit 90 includes a GPS (Global Positioning System) module 106 (a location detecting unit) and an atmosphere pressure specifying unit 107. The GPS module 106 detects the current location (i.e. installation place) of the image forming apparatus 100. The corresponding current location is expressed in latitude and longitude. The atmosphere pressure specifying unit 107 specifies the atmosphere pressure in the region of the installation place of the image forming apparatus 100 on the basis of regional atmosphere pressure information 123 defining atmosphere pressures in individual regions. The regional atmosphere pressure information 123 is downloaded from a Web site providing weather information, in advance. Regions which are defined in the regional atmosphere pressure information 123 are expressed in latitude and longitude. The atmosphere pressure specifying unit 107 specifies the region where there is the current location of the image forming apparatus 100, from the regions defined in the regional atmosphere pressure information 123, and specifies an atmosphere pressure associated with the corresponding region. The atmosphere pressure specifying function of the atmosphere pressure specifying unit 107 may be implemented by circuit elements, or may also be provided to the control device 101.

Figure 6:
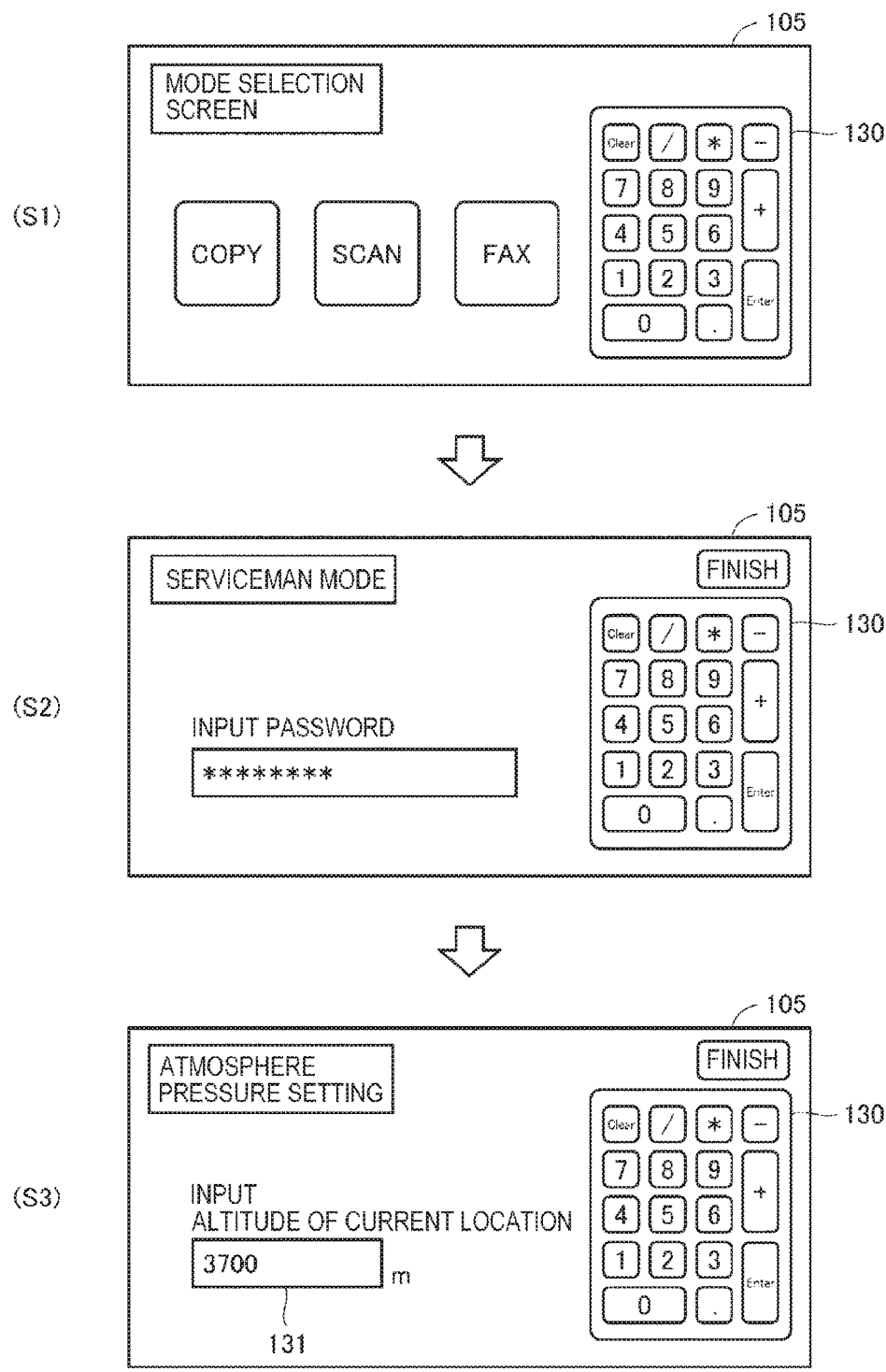
FIG. 6 is a view illustrating an example of screen transition of an operation panel of the image forming apparatus according to the first embodiment.

Now, with reference to FIG. 6, the third acquiring method of acquiring atmosphere pressure will be described. FIG. 6 is a view illustrating an example of screen transition of an operation panel 108 of the image forming apparatus 100. The acquiring unit 90 includes the operation panel 108 for receiving atmosphere pressure inputs. The operation panel 108 is an input device for receiving operation inputs for the image forming apparatus 100.

In STEP S1, the image forming apparatus 100 displays a mode selection screen as an initial state on the operation panel 108. A serviceman of the image forming apparatus 100 can perform a predetermined input on the mode selection screen using numeric keys 130 and so on, thereby capable of switching the image forming apparatus to a mode which only the serviceman can use (hereinafter, also referred to as the "serviceman mode").

In STEP S2, it is assumed that the mode of the image forming apparatus 100 has been switched to the serviceman mode. On the basis of this assumption, the image forming apparatus 100 displays a password input screen on the operation panel 108. The serviceman can input a predetermined password on the password input screen, using the numeric keys 130 and so on, thereby capable of switching the image forming apparatus to a mode for setting the atmosphere pressure in the installation place of the image forming apparatus 100 (hereinafter, also referred to as the "atmosphere pressure setting mode").

In STEP S3, it is assumed that the mode of the image forming apparatus 100 has been switched to the atmosphere pressure setting mode. On the basis of this assumption, the image forming apparatus 100 displays an atmosphere pressure setting screen on the operation panel 108. The atmosphere pressure setting screen includes an altitude input area 131 for receiving an altitude input. The serviceman inputs the altitude of the installation place of the image forming apparatus 100 in the altitude input area 131, using the numeric keys 130 and so on. On the basis of the input altitude, the image forming apparatus 100 calculates the atmosphere pressure in the installation place. The atmosphere pressure can be calculated, for example, on the basis of the following Expression 1.

$$P = P_0 \cdot \{1 - 0.0065 \cdot h/(T + 0.0065 \cdot h + 273.15)\}^{5.257} \quad (1)$$

In Expression 1, "$P_0$" represents the atmosphere pressure at sea level. "$P_0$" is a constant. The unit of "$P_0$" is "hPa". In Expression 1, "h" represents altitude (or elevation). The unit of "h" is "m". In Expression 1, "T" represents temperature. The unit of "T" is "° C.". The temperature "T" may be a constant, or may also be input by the serviceman.

Also, the atmosphere pressure acquiring method is not limited to the above-mentioned first to third acquiring methods, and other acquiring methods may be used. Also, the image forming apparatus 100 does not need to have all the above-mentioned three acquiring functions. The image forming apparatus 100 needs only to have at least one of the above-mentioned three acquiring functions.

Also, the atmosphere pressure acquiring timing of the acquiring unit 90 is arbitrary. In a certain aspect, the acquiring unit 90 implements an atmosphere pressure acquiring process in response to reception of a setup command for the image forming apparatus 100. In other words, the acquiring unit 90 performs the atmosphere pressure acquiring process at the timing when the image forming apparatus 100 is installed.

In another aspect, the acquiring unit 90 performs the atmosphere pressure acquiring process in response to reception of an activation command for the image forming apparatus 100. In other words, the acquiring unit 90 performs the atmosphere pressure acquiring process at the timing when the power of the image forming apparatus 100 is turned on.

(Timing when Control Device 101 Outputs Print Enable Signal)

The timing when the control device 101 outputs the print enable signal will be described while referring to FIG. 5 again.

Figures 7, 8:
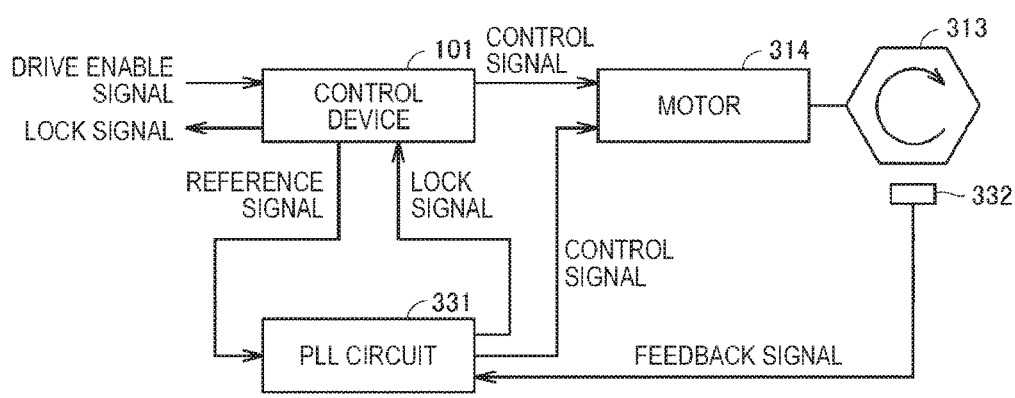
FIG. 7 is a view illustrating the data structure of atmosphere pressure information according to the first embodiment.
FIG. 8 is a view illustrating examples of functional components for implementing PLL control.

As described above, as the atmospheric pressure surrounding the image forming apparatus 100 increases, the control device 101 advances the timing of outputting the print enable signal. The timing of outputting the print enable signal is determined on the basis of the atmosphere pressure information 124. FIG. 7 is a view illustrating the data structure of the atmosphere pressure information 124.

The atmosphere pressure information 124 is stored, for example, in a storage device 120 (see FIG. 12) of the image forming apparatus 100, in advance. The atmosphere pressure information 124 defines the time required for rotation of the polygon mirror 313 to be stabilized after start of the rotation (hereinafter, also referred to as a signal waiting time), for each atmosphere pressure. Typically, the signal waiting time represents the time required to output the print enable signal after the lock signal is output.

Atmosphere pressure items "HIGH", "INTERMEDIATE", and "LOW" defined in the atmosphere pressure information 124 represent atmosphere pressure ranges, respectively. The signal waiting time is defined so as to decrease as the atmosphere pressure increases.

In the example of FIG. 7, the atmosphere pressure item "HIGH" is associated with a signal waiting time "T1". The atmosphere pressure item "INTERMEDIATE" is associated with a signal waiting time "T2" longer than the signal waiting time "T1". The atmosphere pressure item "LOW" is associated with a signal waiting time "T3" longer than the signal waiting time "T2".

From the atmosphere pressure item defined in the atmosphere pressure information 124, the control device 101 specifies an atmosphere pressure relatively close to the atmosphere pressure acquired by the acquiring unit 90. Preferably, from the atmosphere pressure item defined in the atmosphere pressure information 124, the control device 101 specifies an atmosphere pressure closest to the atmosphere pressure acquired by the acquiring unit 90. On the basis of a signal waiting time associated with the specified atmosphere pressure, the control device 101 specifies the timing of outputting the print enable signal. Typically, the control device 101 determines a timing when the signal waiting time has elapsed from output of the above-mentioned lock signal (see FIG. 4), as the timing of outputting the print enable signal. As a result, as the atmosphere pressure in the installation place of the image forming apparatus 100 increases, the timing of outputting the print enable signal is advanced, so the waiting time of the user during printing decreases.

Also, in FIG. 7, the example in which the atmosphere pressure information 124 defines three atmosphere pressure items is shown; however, the atmosphere pressure information 124 may define two atmosphere pressure items, or may define four or more atmosphere pressure items. Also, in FIG. 7, the example in which the atmosphere pressure information 124 is expressed as a table is shown; however, the atmosphere pressure information 124 does not necessarily need to be expressed as a table. For example, the atmosphere pressure information 124 may be expressed by a correlation equation of the atmosphere pressure and the signal waiting time. In the corresponding correlation equation, the atmosphere pressure is expressed as an explanatory variable, and the signal waiting time is expressed as an objective variable.

[PLL Control]

As described above, the control device 101 performs the PLL control for controlling the motor 314 (see FIG. 2). Hereinafter, components for implementing the PLL control will be described with reference to FIG. 8. FIG. 8 is a view illustrating examples of the components for implementing the PLL control.

The image forming apparatus 100 includes the control device 101, the polygon mirror 313, the motor 314, a PLL circuit 331, and an encoder 332, as components for implementing the PLL control.

In response to reception of the drive enable signal for the motor 314, the control device 101 starts driving the motor 314. The encoder 332 is a sensor for detecting the rotation angle of the polygon mirror 313. The detected rotation angle is fed back as a feedback signal to the PLL circuit 331.

The PLL circuit 331 compares the frequency of the feedback signal output from the encoder 332 with the frequency of the reference signal output from the control device 101, to control the rotation speed of the motor 314. More specifically, in a case where the phase of the feedback signal is earlier than the phase of the reference signal, the PLL circuit 331 decreases the rotation speed of the motor 314. In a case where the phase of the feedback signal is later than the phase of the reference signal, the PLL circuit 331 increases the rotation speed of the motor 314. In this way, the PLL circuit 331 maintains the motor 314 at a constant rotation speed.

If the phase of the frequency of the feedback signal coincides with or substantially coincides with the phase of the frequency of the feedback signal, the PLL circuit 331 outputs the lock signal. In other words, if the rotation speed of the polygon mirror 313 falls into a determined range, the PLL circuit 331 outputs the lock signal. After the lock signal is output, the current state is maintained.

[Print Enable Signal Output Flow]

Figure 9:
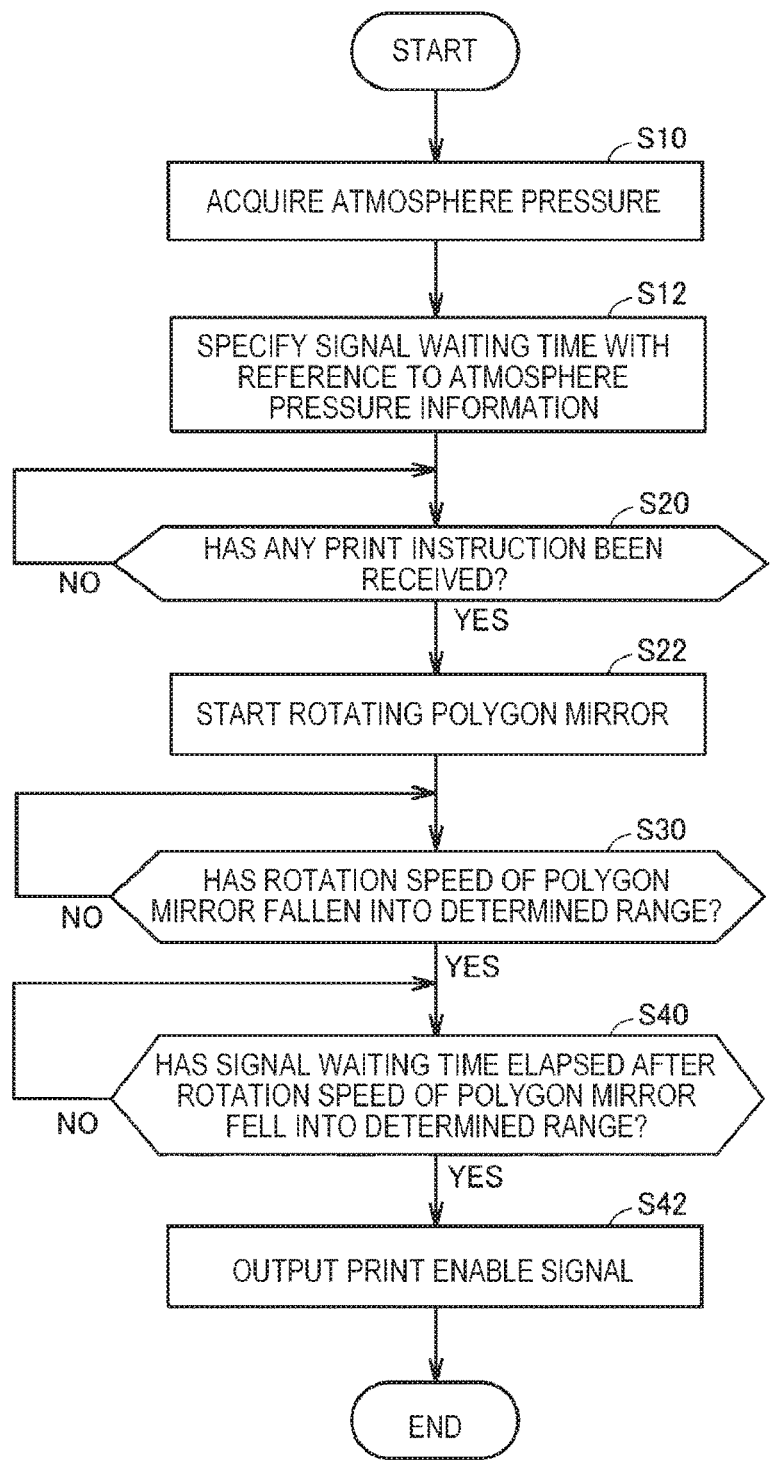
FIG. 9 is a view illustrating a flow chart for controlling the timing of outputting the print enable signal.

With reference to FIG. 9, a flow for controlling the timing of outputting the print enable signal will be described. FIG. 9 is a view illustrating a flow chart for controlling the timing of outputting the print enable signal. The control device 101 of the image forming apparatus 100 executes a program, whereby the process of FIG. 9 is implemented. In another aspect, a part or the whole of the process may be implemented by circuit elements or other hardware.

In STEP S10, the control device 101 acquires the atmosphere pressure in the installation place of the image forming apparatus 100. Typically, the atmosphere pressure is stored in the storage device 120 (see FIG. 12) of the image forming apparatus 100 in advance by acquiring processes of FIGS. 10 and 11 to be described below, and in STEP S10, the control device 101 acquires the atmosphere pressure in the installation place of the image forming apparatus 100, from the storage device 120.

In STEP S12, from the atmosphere pressure item defined in the atmosphere pressure information 124 (see FIG. 7), the control device 101 selects an atmosphere pressure closest to the atmosphere pressure acquired in STEP S10, and specifies a signal waiting time associated with the selected atmosphere pressure.

In STEP S20, the control device 101 determines whether any print instruction has been received from the user of the image forming apparatus 100. In a case of determining that a print instruction has been received from the user of the image forming apparatus 100 ("YES" in STEP S20), the control device 101 switches the control to STEP S22. In a case where any print instruction has not been received ("NO" in STEP S20), the control device 101 performs the process of STEP S20 again.

In STEP S22, the control device 101 starts driving the motor 314 to rotate the polygon mirror 313.

In STEP S30, the control device 101 determines whether the rotation speed of the polygon mirror 313 has fallen into the determined range. In a case of determining that the rotation speed of the polygon mirror 313 has fallen into the determined range ("YES" in STEP S30), the control device 101 switches the control to STEP S40. In a case of determining that the rotation speed has not fallen into the determined range ("NO" in STEP S30), the control device 101 performs the process of STEP S30 again.

In STEP S40, the control device 101 determines whether the signal waiting time specified in STEP S12 has elapsed after the rotation speed of the polygon mirror 313 fell into the determined range. In a case of determining that the signal waiting time specified in STEP S12 has elapsed after the rotation speed of the polygon mirror 313 fell into the determined range ("YES" in STEP S40), the control device 101 switches the control to STEP S42. In a case of determining that the signal waiting time has not elapsed ("NO" in STEP S40), the control device 101 performs the process of STEP S40 again.

In STEP S42, the control device 101 outputs the print enable signal. The output destination of the print enable signal may be the control device 101, or may be each device of the image forming apparatus 100 for performing a process according to printing. If receiving the print enable signal from the control device 101, the image forming apparatus 100 starts the process according to printing (for example, a printing process).

[First Flow for Acquiring Atmosphere Pressure]

Figure 10:
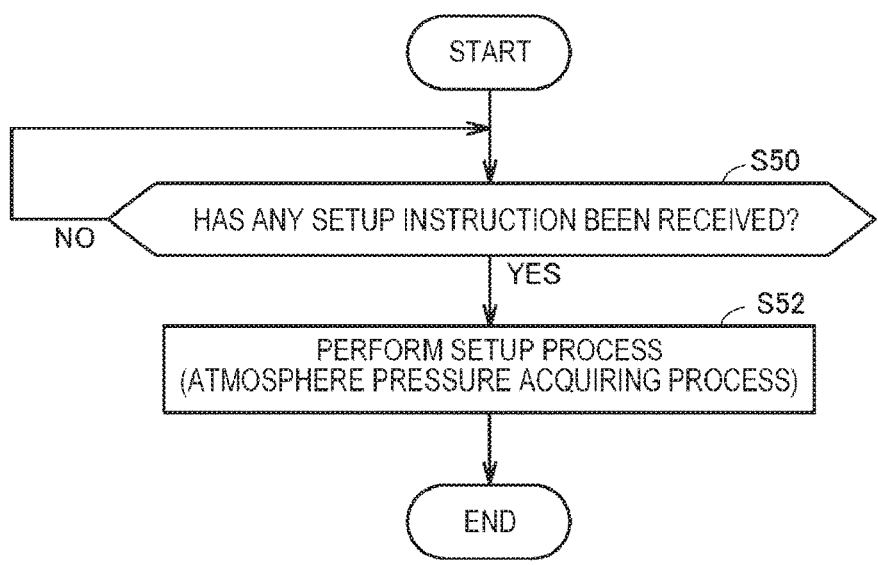
FIG. 10 is a view illustrating a control flow for acquiring atmosphere pressure during setup of the image forming apparatus according to the first embodiment.

With reference to FIG. 10, a control flow for acquiring the atmosphere pressure in the installation place of the image forming apparatus 100 will be described. FIG. 10 is a view illustrating the control flow for acquiring the atmosphere pressure during setup of the image forming apparatus 100. The control device 101 of the image forming apparatus 100 executes a program, whereby the process of FIG. 10 is implemented. In another aspect, a part or the whole of the process may be implemented by circuit elements or other hardware.

In STEP S50, the control device 101 determines whether any setup instruction has been received. In a case of determining that a setup instruction has been received ("YES" in STEP S50), the control device 101 switches the control to STEP S52. In a case of determining that any setup instruction has not been received ("NO" in STEP S50), the control device 101 performs the process of STEP S50 again.

In STEP S52, the control device 101 performs a setup process. As an example of the setup process, the control device 101 acquires the atmosphere pressure in the installation place of the image forming apparatus 100. During the setup process, for example, the above-mentioned third acquiring method of receiving input of the atmosphere pressure by the operation panel 108 (see FIG. 6) is performed. The input atmosphere pressure is stored in the storage device 120 of the image forming apparatus 100. As another setup process, the control device 101 performs an initial operation which is performed during setting of developer, adjustment of positional deviation of the scanner 20 (see FIG. 1), adjustment of positional deviation of transport sheets, and so on.

[Second Flow for Acquiring Atmosphere Pressure]

Figure 11:
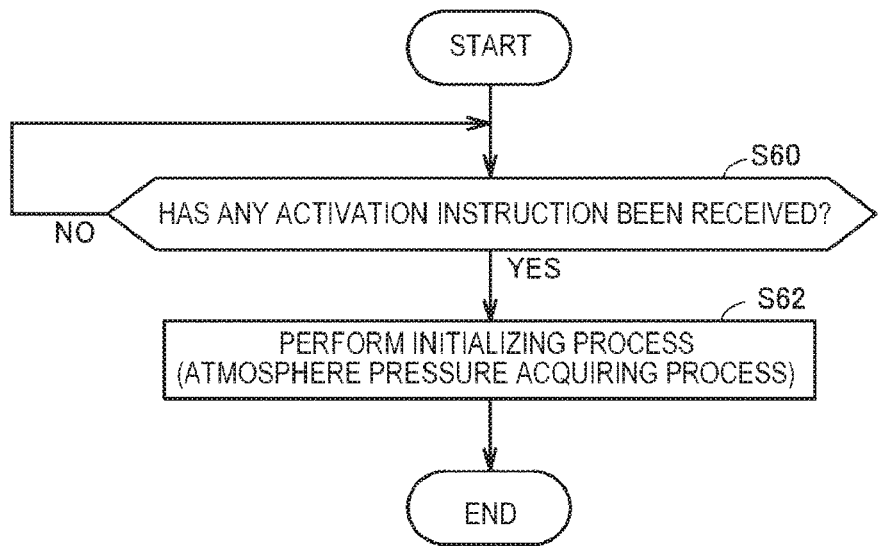
FIG. 11 is a view illustrating a control flow for acquiring atmosphere pressure during activation of the image forming apparatus according to the first embodiment.

With reference to FIG. 11, another control flow for acquiring the atmosphere pressure in the installation place of the image forming apparatus 100 will be described. FIG. 11 is a view illustrating a control flow for acquiring the atmosphere pressure during activation of the image forming apparatus 100. The control device 101 of the image forming apparatus 100 executes a program, whereby the process of FIG. 11 is implemented. In another aspect, a part or the whole of the process may be implemented by circuit elements or other hardware.

In STEP S60, the control device 101 determines whether any instruction for activating the image forming apparatus 100 has been received. In a case of determining that an instruction for activating the image forming apparatus 100 has been received ("YES" in STEP S60), the control device 101 switches the control to STEP S62. In a case of determining that any instruction has not been received ("NO" in STEP S60), the control device 101 performs the process of STEP S60 again.

In STEP S62, the control device 101 performs an initializing process. As the initializing process, the control device 101 performs a process of acquiring the atmosphere pressure in the installation place of the image forming apparatus 100. For example, the above-mentioned first acquiring method or the above-mentioned second acquiring method can be performed. The acquired atmosphere pressure is stored in the storage device 120 of the image forming apparatus 100. The control device 101 performs other initializing processes such as adjustment of the temperature of the fixing device 47 (see FIG. 1), setting of image concentration, and adjustment of color deviation.

[Hardware Configuration of Image Forming Apparatus 100]

Figure 12:
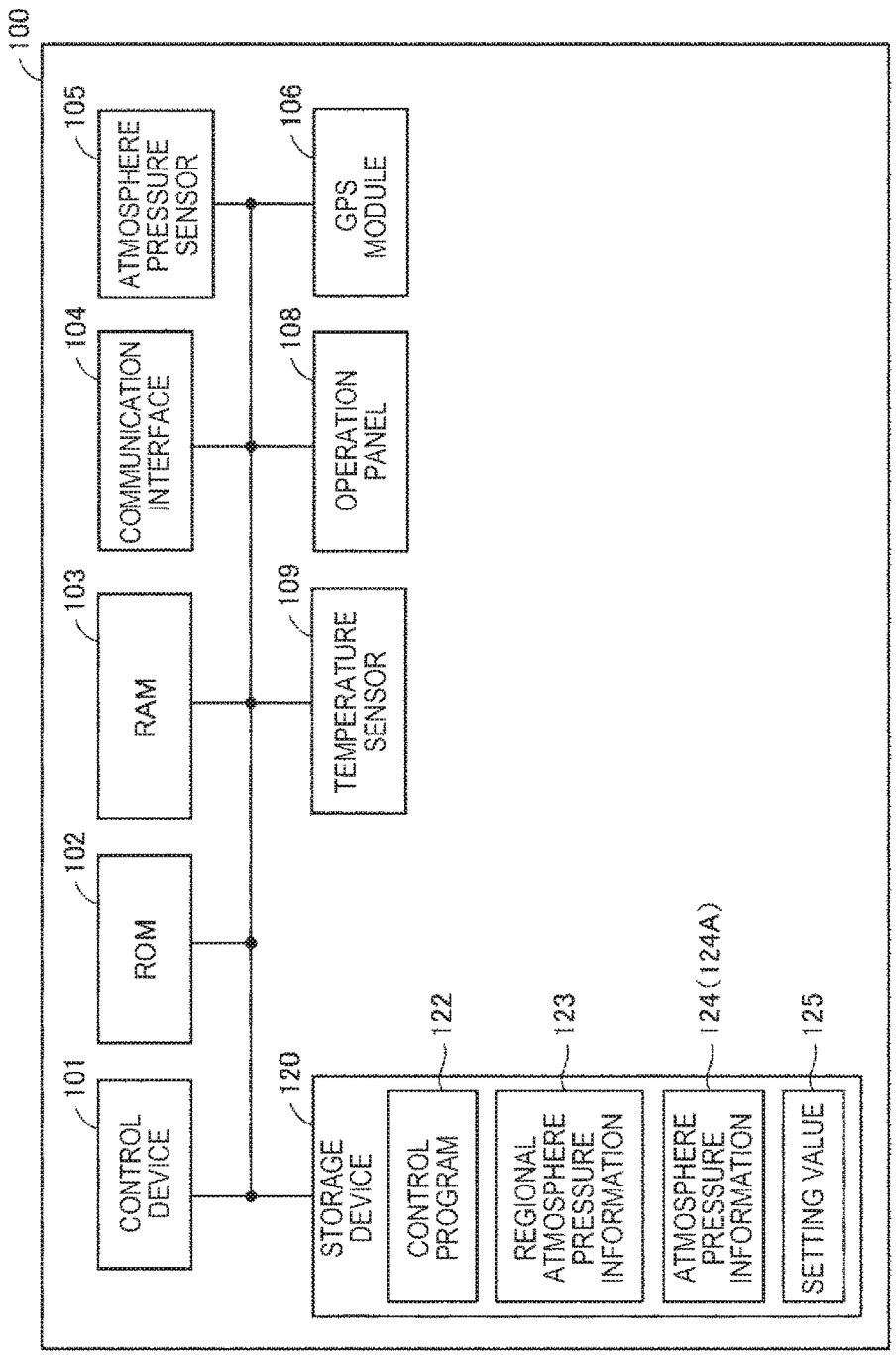
FIG. 12 is a flow chart illustrating an example of the hardware configuration of the image forming apparatus according to the first embodiment.

With reference to FIG. 12, an example of the hardware configuration of the image forming apparatus 100 will be described. FIG. 12 is a block diagram illustrating an example of the hardware configuration of the image forming apparatus 100.

As shown in FIG. 12, the image forming apparatus 100 includes the control device 101, a ROM (Read Only Memory) 102, a RAM (Random Access Memory) 103, a communication interface 104, the atmosphere pressure sensor 105, the GPS module 106, the operation panel 108, a temperature sensor 109, and the storage device 120.

The control device 101 controls the operation of the image forming apparatus 100 by executing various programs such as a control program 122 according to the present invention. In response to reception of a command to execute the control program 122, the control device 101 reads the control program 122 from the storage device 120 into the ROM 102. The RAM 103 functions as a working memory for temporarily storing a variety of data necessary to execute the control program 122.

The communication interface 104 is connected to an antenna (not shown in the drawings) and so on. The image forming apparatus 100 performs data communication with external communication devices through the antenna. Examples of the external devices include portable communication terminals such as smart phones, servers, and so on. The image forming apparatus 100 may be configured to be capable of downloading the control program 122 according to the present embodiment from a server through the antenna.

The atmosphere pressure sensor 105 is installed inside the image forming apparatus 100, and detects the atmosphere pressure in the installation place of the image forming apparatus 100. Preferably, the atmosphere pressure sensor 105 is installed in the vicinity of the polygon mirror 313 (see FIG. 2) inside the print head 300 (see FIG. 2), and detects the atmosphere pressure around the polygon mirror 313.

The GPS module 106 receives electric waves from a plurality of satellites through the antenna (not shown in the drawings). On the basis of times taken to receive the electric waves after transmission of the electric waves from the satellites, the GPS module 106 detects the current location of the image forming apparatus 100. The detected current location can be expressed, for example, in latitude and longitude.

The operation panel 108 is configured, for example, with a touch panel and a display. The touch panel and the display overlap each other. The operation panel 108 receives various operations such as a scan operation and a print operation from the user by touch operations.

The temperature sensor 109 is installed inside the image forming apparatus 100, and detects the internal temperature of the image forming apparatus 100. Preferably, the temperature sensor 109 is installed inside the print head 300, and detects the internal temperature of the print head 300. The temperature sensor 109 is, for example, a thermistor.

The storage device 120 is a storage medium such as a hard disk or an external storage device. For example, in the storage device 120, the control program 122 according to the present embodiment, the above-mentioned regional atmosphere pressure information 123 (see FIG. 5), the above-mentioned atmosphere pressure information 124 (see FIG. 7), and an atmosphere pressure setting value 125 set by the user or the serviceman are stored. The control program 122, the regional atmosphere pressure information 123, the atmosphere pressure information 124, and the setting value 125 do not necessarily need to be stored in the storage device 120, and may be stored in a storage area (for example, a cache) of the control device 101, the ROM 102, the RAM 103, a storage area provided in the print head 300 (see FIG. 1), an external device (for example, a server), or the like.

The control program 122 may be incorporated as a portion of a predetermined program, not as a single program. In this case, the processes according to the present embodiment are implemented in cooperation with the predetermined program. Even a program which does not include such a module as a part does not depart from the spirit of the control program 122 according to the present embodiment. Also, some or all of functions which are provided by the control program 122 may be implemented by dedicated hardware. Further, the image forming apparatus 100 may be configured in a form like a so-called cloud service in which at least one server performs a part of the process of the control program 122.

Summary of First Embodiment

As the ambient atmospheric pressure increases, rotation of the polygon mirror 313 is stabilized earlier. For this reason, the image forming apparatus 100 according to the first embodiment advances the timing of outputting the print enable signal as the ambient atmospheric pressure increases. As a result, the image forming apparatus 100 can reduce the printing time, and it is possible to reduce the waiting time of the user.

Second Embodiment

[Outline]

The load which is applied to the polygon mirror 313 during rotation fluctuates according to the internal temperature of the image forming apparatus 100. For this reason, the timing at which rotation of the polygon mirror 313 is stabilized also varies according to the internal temperature of the image forming apparatus 100. In other words, an appropriate timing of outputting the print enable signal varies according to the internal temperature of the image forming apparatus 100.

The image forming apparatus 100 according to the first embodiment controls the timing of outputting the print enable signal, on the basis of the ambient atmospheric pressure. In contrast with this, an image forming apparatus 100 according to the second embodiment controls the timing of outputting the print enable signal, not only on the basis of the ambient atmospheric pressure but also on the basis of the internal temperature of the image forming apparatus 100.

Particularly, in a case where the motor 314 of the polygon mirror 313 is driven by dynamic oil pressure, the influence of the temperature becomes remarkable. In this case, oil is put between the motor 314 and the bearing of the motor 314 (not shown in the drawings). The shaft of the motor 314 floats from the bearing due to dynamic oil pressure produced by rotation, and thus smoothly rotates. In this case, as the temperature decreases, the viscosity of the oil increases. If the viscosity of the oil increases, the load which is applied to the motor 314 during rotation increases, whereby the rate of decrease in the rotation speed of the polygon mirror 313 when the motor 314 is stationary increases. As a result, rotation of the polygon mirror 313 is stabilized early.

Therefore, not only as the ambient atmospheric pressure increases but also as the internal temperature of the image forming apparatus 100 decreases, the image forming apparatus 100 advances the timing of outputting the print enable signal. As a result, the image forming apparatus 100 can output the print enable signal at a more appropriate timing.

Also, since the hardware configuration and the like of the image forming apparatus 100 according to the second embodiment is the same as those of the image forming apparatus 100 according to the first embodiment, hereinafter, descriptions thereof will not be repeated.

[Print Enable Signal Output Flow]

Figure 13:
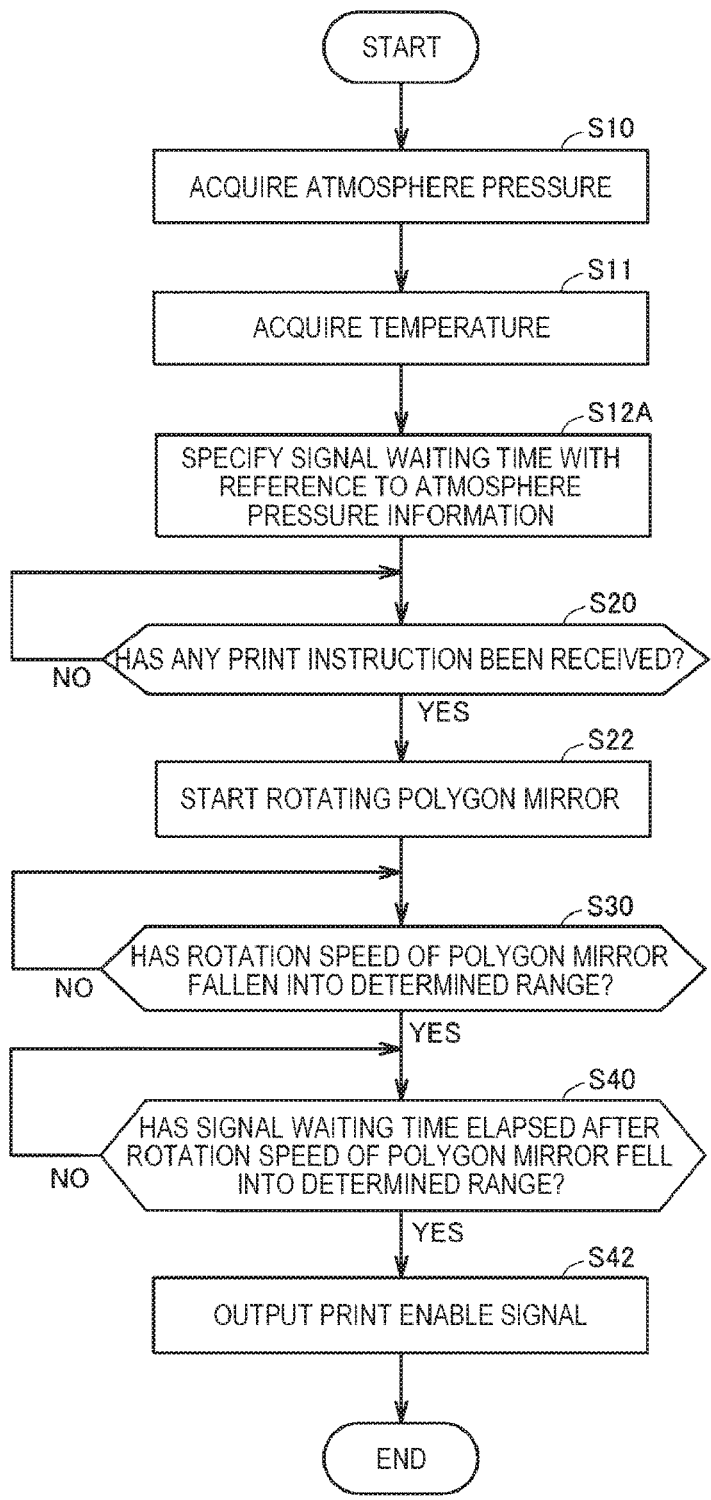
FIG. 13 is a view illustrating a flow chart for controlling a timing of outputting the print enable signal.

With reference to FIG. 13, a flow for controlling the timing of outputting the print enable signal will be described. FIG. 13 is a view illustrating a flow chart for controlling the timing of outputting the print enable signal.

The control device 101 of the image forming apparatus 100 executes a program, whereby the process of FIG. 13 is implemented. In another aspect, a part or the whole of the process may be implemented by circuit elements or other hardware.

Also, processes of FIG. 13 other than STEPS S11 and S12A are the same as those described with reference to FIG. 9, so descriptions thereof will not be repeated.

In STEP S11, the control device 101 acquires the internal temperature of the print head 300 (see FIG. 2) from the temperature sensor 109 (see FIG. 12).

In STEP S12A, the control device 101 determines a signal waiting time with reference to atmosphere pressure information 124A shown in FIG. 14. FIG. 14 is a view illustrating the data structure of the atmosphere pressure information 124A.

The atmosphere pressure information 124A is stored, for example, in a storage device 120 (see FIG. 12) of the image forming apparatus 100, in advance. Atmosphere pressure items "HIGH", "INTERMEDIATE", and "LOW" defined in the atmosphere pressure information 124A represent atmosphere pressure ranges, respectively. Temperature items "HIGH", "INTERMEDIATE", and "LOW" defined in the atmosphere pressure information 124A represent temperature ranges, respectively. The atmosphere pressure information 124A defines the signal waiting time required to output the print enable signal after output of the lock signal for each combination of an atmosphere pressure item and a temperature item. The signal waiting time is defined so as to decrease not only as the atmosphere pressure increases but also as the temperature decreases.

In the example of FIG. 14, the combination of the atmosphere pressure item "HIGH" and the temperature item "HIGH" is associated with a signal waiting time "T3". The combination of the atmosphere pressure item "HIGH" and the temperature item "INTERMEDIATE" is associated with a signal waiting time "T2". The combination of the atmosphere pressure item "HIGH" and the temperature item "LOW" is associated with a signal waiting time "T1". The combination of the atmosphere pressure item "INTERMEDIATE" and the temperature item "HIGH" is associated with a signal waiting time "T4". The combination of the atmosphere pressure item "INTERMEDIATE" and the temperature item "INTERMEDIATE" is associated with the signal waiting time "T3". The combination of the atmosphere pressure item "INTERMEDIATE" and the temperature item "LOW" is associated with the signal waiting time "T2". The combination of the atmosphere pressure item "LOW" and the temperature item "HIGH" is associated with a signal waiting time "T5". The combination of the atmosphere pressure item "LOW" and the temperature item "INTERMEDIATE" is associated with the signal waiting time "T4". The combination of the atmosphere pressure item "LOW" and the temperature item "LOW" is associated with the signal waiting time "T3".

The signal waiting time "T1" is shorter than the signal waiting time "T2". The signal waiting time "T2" is shorter than the signal waiting time "T3". The signal waiting time "T3" is shorter than the signal waiting time "T4". The signal waiting time "T4" is shorter than the signal waiting time "T5".

From the combinations of the atmosphere pressure items and the temperature items defined in the atmosphere pressure information 124A, the control device 101 selects a combination closest to the combination of the atmosphere pressure acquired in STEP S10 and the temperature acquired in STEP S11. From the signal waiting times defined in the atmosphere pressure information 124A, the control device 101 specifies a signal waiting time associated with the selected combination. On the basis of the specified signal waiting time, the control device 101 determines the timing of outputting the print enable signal.

Also, in FIG. 14, the example in which the atmosphere pressure information 124 defines three atmosphere pressure items and three temperature items is shown; however, the atmosphere pressure information 124 may define two atmosphere pressure items and two temperature items, or may define four or more atmosphere pressure items and four or more temperature items. Also, in FIG. 14, the example in which the atmosphere pressure information 124A is expressed as a table is shown; however, the atmosphere pressure information 124A does not necessarily need to be expressed as a table. For example, the atmosphere pressure information 124A may be expressed by a correlation equation of the atmosphere pressure, the temperature, and the signal waiting time. In the corresponding correlation equation, the atmosphere pressure and the temperature are expressed as explanatory variables, and the signal waiting time is expressed as an objective variable.

Summary of Second Embodiment

Not only as the ambient atmospheric pressure increases but also as the ambient temperature decreases, rotation of the polygon mirror is stabilized earlier. For this reason, the image forming apparatus 100 according to the second embodiment advances the timing of outputting the print enable signal not only as the ambient atmospheric pressure increases but also as the internal temperature of the image forming apparatus 100 decreases. The image forming apparatus 100 determines the timing of outputting the print enable signal on the basis of both of the atmosphere pressure and the temperature, such that it is possible to output the print enable signal at a more appropriate timing. As a result, the image forming apparatus 100 can reduce the printing time, and it is possible to further reduce the waiting time of the user.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

According to an aspect, it is possible to output the print enable signal at an appropriate timing according to ambient atmospheric pressure.

The above-mentioned and other objects, features, aspects, and advantages of the present invention will be clarified from the following detailed description of the present invention understood in relation to the accompanying drawings.

Although the present invention has been described and illustrated in detail, it is clearly understood that the same is by way of illustrated and example only and is not to be taken by way of limitation, the scope of the present invention being interpreted by terms of the appended claims.

What is claimed is:

1. An image forming apparatus comprising:
   an acquiring unit acquiring atmosphere pressure in the installation place of the image forming apparatus;
   photoconductors;
   light sources radiating laser light;
   a polygon mirror rotatable and exposing the photoconductors by reflecting the laser light toward the photoconductors while rotating; and a control device controlling rotation of the polygon mirror, wherein the control device outputs an enable signal for allowing the image forming apparatus to perform printing, when rotation of the polygon mirror is stabilized after start of the rotation, and the control device adjusts the timing of outputting the enable signal on the basis of the atmosphere pressure acquired by the acquiring unit.

2. The image forming apparatus according to claim 1, further comprising:

a storage unit storing atmosphere pressure information defining a time required to stabilize rotation of the polygon mirror after start of rotation for each atmosphere pressure, wherein the control device specifies an atmosphere pressure closest to the atmosphere pressure acquired by the acquiring unit, from atmosphere pressures defined in the atmosphere pressure information, and determines the timing of outputting the enable signal, on the basis of a time associated with the specified atmosphere pressure.

3. The image forming apparatus according to claim 1, wherein:

the acquiring unit includes an atmosphere pressure sensor detecting atmosphere pressure.

4. The image forming apparatus according to claim 1, wherein:

the acquiring unit includes an operation panel receiving an atmosphere pressure input.

5. The image forming apparatus according to claim 1, wherein:

the acquiring unit includes:
- a location detecting unit detecting the installation place of the image forming apparatus; and
- an atmosphere pressure specifying unit specifying atmosphere pressure in the installation place of the image forming apparatus, on the basis of information defining atmosphere pressures in individual regions.

6. The image forming apparatus according to claim 1, further comprising:

a temperature sensor detecting the internal temperature of the image forming apparatus, wherein the control device advances the timing of outputting the enable signal as the atmosphere pressure increases and as the temperature decreases.

7. The image forming apparatus according to claim 6, wherein:

oil is put between a motor driving the polygon mirror and a bearing of the motor.

8. The image forming apparatus according to claim 1, wherein:

the control device controls a motor driving the polygon mirror by PLL (Phase Locked Loop) control.

9. The image forming apparatus according to claim 1, wherein:

the control device outputs the enable signal if a predetermined time elapses after the rotation speed of the polygon mirror falls into a determined range, and the control device reduces the predetermined time as the atmosphere pressure increases.

10. The image forming apparatus according to claim 1, wherein:

the acquiring unit performs the atmosphere pressure acquiring process in response to reception of a setup command for the image forming apparatus.

11. The image forming apparatus according to claim 1, wherein:

the acquiring unit performs the atmosphere pressure acquiring process in response to reception of an activation command for the image forming apparatus.

12. A control method of an image forming apparatus having a polygon mirror, comprising:

acquiring atmosphere pressure in the installation place of the image forming apparatus;

radiating laser light onto the polygon mirror while rotating the polygon mirror, thereby exposing photoconductors to the laser light reflected from the polygon mirror; and outputting an enable signal for allowing the image forming apparatus to perform printing, when rotation of the polygon mirror is stabilized after start of the rotation, and adjusting a timing of outputting the enable signal on the basis of the atmosphere pressure acquired.

13. A non-transitory recording medium storing a computer readable program which is a control program for an image forming apparatus having a polygon mirror, wherein:

the control program makes the image forming apparatus perform the following:

acquiring atmosphere pressure in the installation place of the image forming apparatus;

radiating laser light onto the polygon mirror while rotating the polygon mirror, thereby exposing photoconductors to the laser light reflected from the polygon mirror; and outputting an enable signal for allowing the image forming apparatus to perform printing, when rotation of the polygon mirror is stabilized after start of the rotation, and adjusting a timing of outputting the enable signal on the basis of the atmosphere pressure acquired.

* * * * *